United States Patent [19]

Bench, Sr.

[11] Patent Number: 4,610,119
[45] Date of Patent: Sep. 9, 1986

[54] LAMINATED DOOR TO WITHSTAND VANDALISM AND METHOD OF MANUFACTURE THEREOF

[76] Inventor: Leigh R. Bench, Sr., 37 St. Andrews Rd., Severna Park, Md. 21146

[21] Appl. No.: 701,166

[22] Filed: Feb. 13, 1985

[51] Int. Cl.[4] .............................................. E04C 1/00
[52] U.S. Cl. .................................. 52/309.3; 52/455; 52/813; 428/412
[58] Field of Search ................ 52/232, 455, 813, 830, 52/783, 785, 309.3; 428/412

[56] References Cited

U.S. PATENT DOCUMENTS

| | | | |
|---|---|---|---|
| 2,717,187 | 9/1955 | Morgan et al. | 52/813 |
| 3,657,057 | 4/1972 | Shorr et al. | 528/412 |
| 3,681,167 | 8/1972 | Moore | 428/412 |
| 3,810,815 | 5/1974 | Welhart et al. | 428/412 |
| 4,075,804 | 2/1978 | Zimmerman | 52/232 |
| 4,279,414 | 7/1981 | Kammerman | 52/309.8 |

FOREIGN PATENT DOCUMENTS 0006231 1/1980 European Pat. Off. ............ 428/412

OTHER PUBLICATIONS

General Electric Publication, Technical Report CDC-502 dated Jan. 18, 1962, 11 pages.

*Primary Examiner*—James L. Ridgill, Jr.
*Attorney, Agent, or Firm*—Leonard Bloom

[57] ABSTRACT

A laminated exterior door has two polycarbonate sheets adhesively bonded to a composite substrate. The complementary surfaces of the polycarbonate sheets and the substrate are each abraded to a maximum depth of about 0.005 inch, and a pressure of about 100 p.s.i. is exerted to effect the adhesive bond. After bonding, the adhesive remains sufficiently "tacky" to accommodate the different coefficients of expansion between the polycarbonate sheets and the substrate. As a result, the laminated door has relatively-high impact resistance for withstanding vandalism, forced entry, burglary or the like.

10 Claims, 8 Drawing Figures

LAMINATED DOOR TO WITHSTAND VANDALISM AND METHOD OF MANUFACTURE THEREOF

FIELD OF THE INVENTION

The present invention relates to a laminated impact-resistant structure for a closure providing access to a home, apartment or other interior; and more particularly, to a laminated door for inhibiting and withstanding vandalism, burglary, forced entry or the like, as well as the method of manufacture thereof.

BACKGROUND OF THE INVENTION

The exterior doors for homes, apartments, condos and the like are usually made of wood, such as a hardwood, and may have a metal cladding to form a composite laminated structure. In lieu of a wooden substrate or core, a suitable foam plastic may be employed. While generally satisfactory for the purposes intended, these doors have relatively poor impact resistance, hence are subject to vandalism and burglary. A single hammer blow, or at most a short series of hammer blows, is usually all that is required to smash an exterior door. The average wooden door or residential steel door can usually be kicked open by a single blow of the foot.

In some installations, the doors have to be replaced repeatedly. For example, the City of Baltimore presently replaces about 3000 entrance doors per year in apartment projects alone. Extrapolating this experience on a national level indicates that several hundred thousand entrance doors must be replaced on an annual basis. While age alone accounts for a small percentage of this total, most of these doors are replaced because of vandalism or forced entry. Thus door replacement is both aggravating and expensive, and a solution to this vexing problem has eluded the prior researchers.

In an effort to control such wanton vandalism, I have experimented for over ten years. Literally hundreds of materials and construction modes have been tested in an effort to develop an economically feasible door that could withstand repeated abuse. I have also experimented with the use of relatively high-impact resistant materials for the outer surface or face of a door, thereby forming a laminated structure. One such material is a polycarbonate manufactured and sold by General Electric Company under its trademark "LEXAN". This material has been used in other applications, such as laminated structures for high-impact resistant (or "bulletproof") glass.

However, problems have been encountered in suitably adapting a polycarbonate sheet for a laminated door. First, if the polycarbonate sheet is bonded to only the exterior surface of the door, the door will tend to warp, even though the polycarbonate sheet itself will not crack or shatter. Second, the polycarbonate sheet and the substrate (or core) of the door will have different coefficients of expansion. Thus, with the temperature variations experienced from the winter to summer seasons, the polycarbonate sheet will tend to warp or separate from the door substrate; and the adhesives available in the marketplace have been totally unsatisfactory in maintaining a good bond between the polycarbonate sheet and the door substrate.

SUMMARY OF THE INVENTION

I have discovered that, by using two polycarbonate sheets—one bonded to the exterior surface of the substrate, and the other bonded to the interior surface of the substrate, thereby forming a "sandwich" arrangement—that the warping problem is completely avoided. I have further discovered that by using a special adhesive, one formulated by the 3M Company for use on the Alaskan pipeline project, that it was possible to obtain a satisfactory bond between the door substrate and the polycarbonate sheets, provided that the respective adjacent surfaces of the substrate and the sheets were abraded prior to applying the adhesive. After the adhesive is applied, transverse pressure is exerted to suitably bond the laminated door structure.

Another feature of my invention is that the adhesive remains somewhat "tacky[ or "sticky" after curing. This characteristic of the adhesive, in this particular combination, accommodates the different coefficients of expansion between the door substrate and the polycarbonate sheets. As a result, the laminated bond will remain solid, and the polycarbonate sheets will not separate from the substrate. This feature is important because of temperature variations and gradients encountered by an exterior door throughout the year.

Accordingly, it is an object of my invention to provide a laminated door structure having very high impact resistance, thereby inhibiting vandalism, burglary, forced entry and the like, and affording superior protection for the property and its occupants.

It is another object to provide a laminated door that has an attractive appearance, yet is also weather-proof.

It is a further object to provide a laminated door that may be manufactured easily and economically from readily available materials.

It is still a further object to provide an improved manufacturing method for an impact resistant door intended to inhibit vandalism, burglary, forced entry or the like.

In accordance with the objects of this invention, a preferred embodiment of a laminated door to inhibit and withstand vandalism is herein disclosed. The door includes a substrate and a pair of sheets of polycarbonate on either side of the substrate. The polycarbonate sheets are substantially thinner than the thickness of the substrate. Means are provided, including an adhesive, for bonding each sheet to the substrate. The adhesive remains sufficiently tacky to accomodate the different coefficients of expansion between the substrate and the polycarbonate sheets.

Preferably, the means for bonding each sheet to the substrate further includes abrasions on each side of the substrate and on the inner sides of each polycarbonate sheet. The polycarbonate sheets are substantially opaque, and the outer surface of each sheet is embossed.

In accordance with the further objects of this invention, there is herein disclosed an improved method for making a laminated door to inhibit and withstand vandalism. The method includes the steps of providing a substrate having respective outer surfaces, and further providing at least one polycarbonate sheet for a respective outer surface of the substrate, each sheet having an inner surface. At least one of the outer surfaces of the substrate and the inner surface of the sheet are abraded. An adhesive is applied to at least said one surface of the substrate and the inner surface of the sheet, and pressure is exerted between the substrate and the sheet to bond the sheet to the substrate. After bonding, the adhesive remains sufficiently tacky to accomodate the different coefficients of expansion between the substrate and the polycarbonate sheet.

Preferably, two polycarbonate sheets are used, one for each of the outer surfaces of the substrate. The inner surface of each sheet and the outer surfaces of the substrate are abraded, preferably by means of a stationary drum sander, to a maximum depth of about 0.005 inch.

These and other objects of the present invention will become apparent from the following specification, taken in conjunction with the enclosed drawings.

BRIEF DESCRIPTION OF THE DRAWINGS

FIG. 7 is a schematic illustration of the ability of the finished laminated door to resist repeated hammer blows or impacts, thereby inhibiting and withstanding vandalism, burglary or the like.

GENERAL DESCRIPTION OF THE PREFERRED EMBODIMENT

Figure 1:
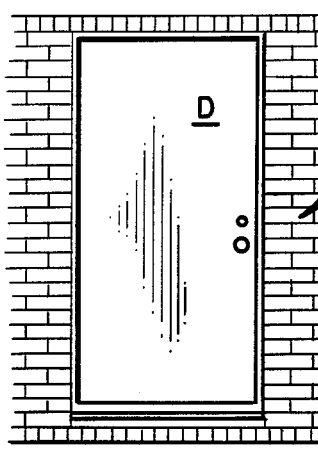
FIG. 1 is a front elevation of a typical prior art exterior door.

With reference to FIG. 1, there is illustrated a typical prior art door D, the frame for which is enclosed by a brick wall W. This type of prior art exterior door is in widespread use; it does not withstand vandalism or forced entry; and it is often replaced, sometimes repeatedly.

Figure 2:
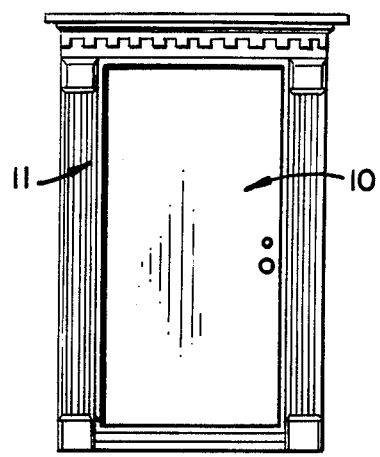
FIG. 2 is a front elevation of a typical exterior door incorporating the teachings of the present invention.

Contrasted thereto, and with reference to FIG. 2, there is illustrated an exterior door 10 with which the teachings of the present invention may find more particular utility. It will be appreciated, however, that the teachings of the present invention are not necessarily restricted to an exterior door, but rather, are equally applicable to a wide variety of doors and closures, both interior and exterior. With this in mind, the door 10 is received within a suitable frame or jamb 11 and is pivotably mounted therein by suitable hinges, which, being "hidden", have been omitted for ease of illustration.

Figure 3:
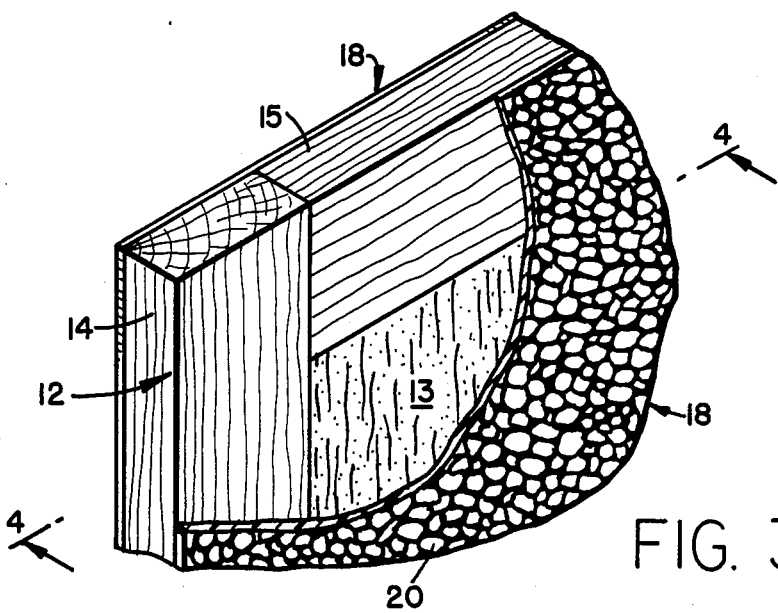
FIG. 3 is a cutaway perspective view of an enlarged portion of FIG. 1, showing a preferred form of two polycarbonate sheets, having an embossed exterior, and adhesively bonded to the respective outer surfaces of the door.
Figure 4:
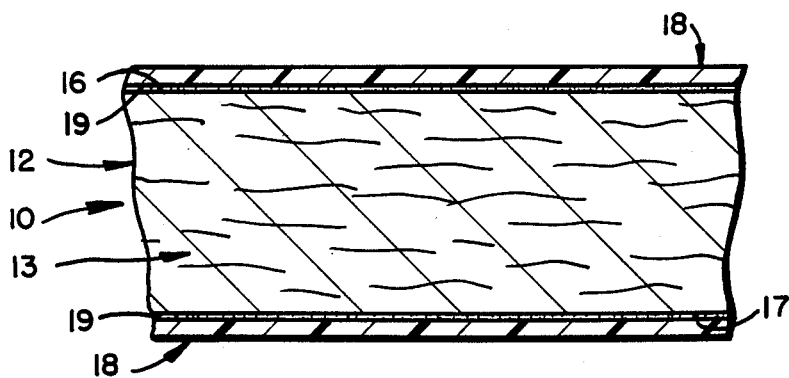
FIG. 4 is a section view taken across the lines 4—4 of FIG. 3.

With further reference to FIGS. 3 and 4, the door 10 includes a suitable substrate or core 12. In the preferred embodiment, as shown more clearly in FIG. 3, the core 12 includes a solid fiberboard 13 and respective stiles 14 and rails 15 of wood. The fiberboard may be of No. 47 density and is 1½ inch thick, and the stiles and rails are manufactured from lumber approximately 1½×3½ inches.

As shown more clearly in FIG. 4, the substrate has a pair of parallel outer surfaces 16 and 17, and a polycarbonate sheet 18 is bonded to each of the outer surfaces of the door substrate by means of an adhesive 19. The polycarbonate sheet may be supplied by General Electric Company under its registered trademark "LEXAN". However, an equivalent polycarbonate (or other) sheet having relatively-high impact resistance may be equally feasible. The polycarbonate sheet is substantially thinner than the door substrate, as shown more clearly in FIG. 4. In the preferred embodiment, the wooden substrate is 1½ inches thick and each polycarbonate sheet is ⅛ inch, thus making the finished door 1¾ inch thick.

The adhesive is supplied by 3M Company, carries the nomenclature "1-XA-3506-B-A", and generally comprises a two-part moisture curing urethane (or a variation thereof). It was used on the Alaskan pipeline project. An important characteristic of the adhesive is that it remains somewhat "tacky" or "sticky" after bonding. For example, if the door is cut to expose its cross-section, a thumbnail will make a slight indentation in the adhesive. This characteristic of the adhesive will allow the polycarbonate sheets to "shift" parallel to, and with respect to, the wooden substrate while maintaining the adhesive bond of the laminated structure. As a result, the different coefficients of expansion between the polycarbonate sheets and the substrate are readily accommodated. This is important for an exterior door that encounters temperature variations between the inside of the house (or other enclosure) and the outside ambient temperature, and between the summer and winter seasons. The polycarbonate sheets will not warp or peel away from the wooden substrate, and the integrity of the laminated structure is maintained.

Preferably, each polycarbonate sheet is substantially opaque and has an embossed or irregular outer surface 20 (see FIG. 3) to provide a "white pebble grain" effect. This embossed outer surface has a pleasing architectural appearance, yet will resist scratches, mars or indentations occasioned during normal use of the structure, or whenever a deliberate vandalism, burglary or forced entry is attempted.

Figure 5:
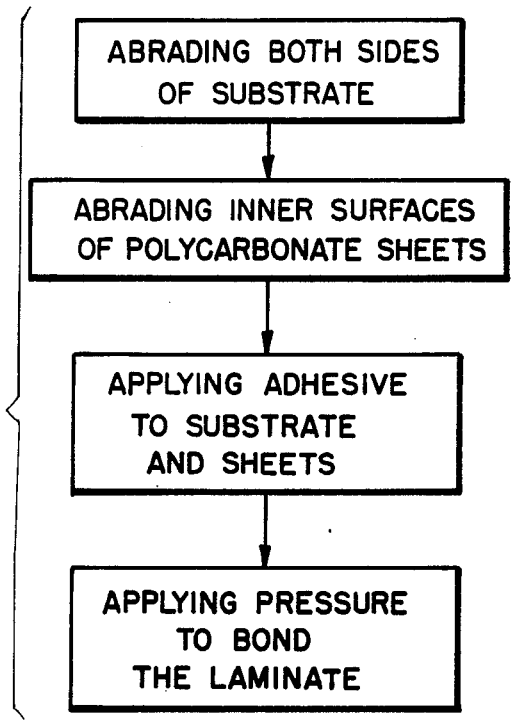
FIG. 5 is a schematic block diagram, showing the sequence of steps in the preferred method of making the improved laminated door of the present invention.
Figure 6:
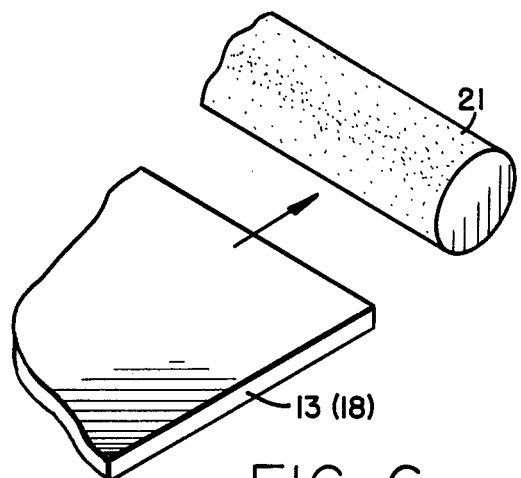
FIG. 6 is a schematic perspective, illustrating a drum sander for abrading the inner surfaces of the polycarbonate sheets, as well as the complementary outer surfaces of the door.

With reference to FIGS. 5-6, the improved method includes the use of a stationary drum sander, illustrated schematically as at 21 (or other equivalent tool) for abrading the inner surface of each polycarbonate sheet as well as the corresponding outer surface of the door substrate. Each of these surfaces should be abraded (or otherwise scratched or roughened) to a maximum depth of about 0.005 inch.

After the adhesive is suitably applied, and preferably to each of the complementary abraded surfaces, a stack of the door substrates with the polycarbonate sheets interspersed therebetween are placed in a suitable press; and pressure is applied (preferably of about 100 p.s.i.) to bond the respective laminated structures. The adhesive will be cured to effect the laminated bonded structure at ambient factory temperatures, so that pre-heating or baking ovens to cure the adhesive are not necessary. Thus, the improved method is relatively fast and economical; and as a result, the finished product may be reasonably priced (considering its long-term benefits) for relatively widespread marketing through a variety of distribution channels.

Figure 7:
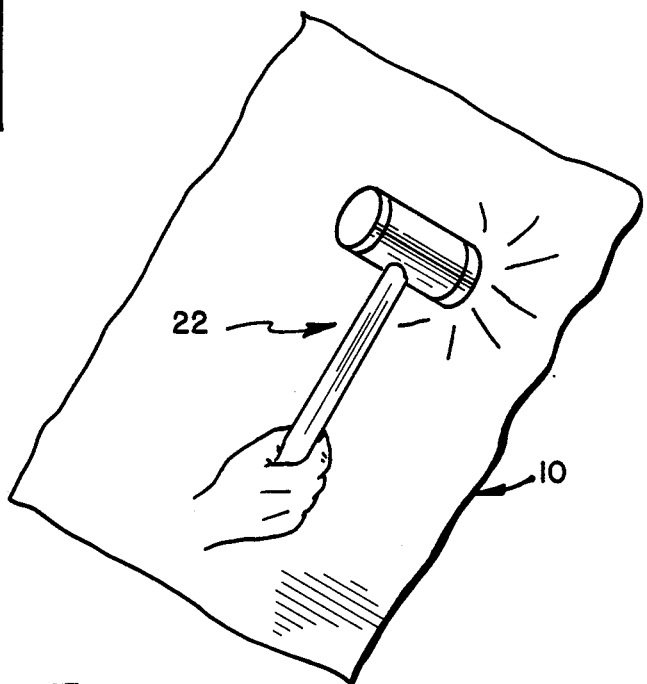

With reference to FIG. 7, there is schematically illustrated a small sledge or mall 22 (or claw hammer) striking a series of hammer blows to the laminated door of the present invention. The door has excellent impact resistance and will maintain its structural integrity despite a continuous series of hammer blows. Accordingly, the door of the present invention has sufficient strength to withstand vandalism, forced entry or burglary for superior protection of the home and its occupants, as well as providing a pleasing appearance and improved strength for normal long-term use and enjoyment.

The improved door of the present invention can be mounted in any wood, steel, or aluminum jamb, and with any of the threshold systems presently available in the marketplace. It is recommended that 4½"×4½" steel butt hinges (similar to Stanley #F-179) should be used, preferably 3 hinges per door. The improved door of the present invention may be made in any of the common widths and heights presently found in doors of other types. Light panels with unbreakable "LEXAN" glazing (already installed) are also available.

Tests performed on prototype samples of the improved door of the present invention have exceeded federal specifications. For example, in a comparison test, a conventional steel door and the improved door of the present invention were subjected to "break in" by four large men. The steel door was kicked open on the first attempt. Thsent invention were subjected to "break in" by four large men. The steel door was kicked open on the first attempt. The improved door of the present invention withstood the assault of all four men until they decided that the door could not be forced open.

The LEXAN sheet has a permanent finish and does not usually require painting to assure long life. However, if over an extended period of time the finish becomes somewhat dull or disclored, the door can be easily painted with a suitable latex-based paint.

Figure 8:
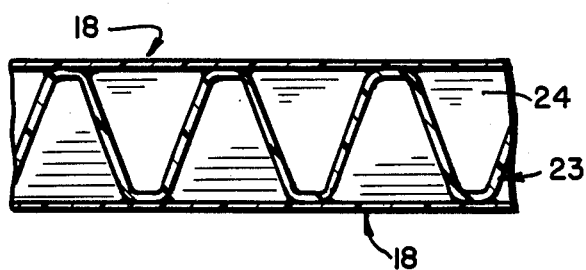
FIG. 8 corresponds substantially to FIG. 4, but constitutes a cutaway view illustrating an alternate embodiment using a high-impact styrene core.

With reference to FIG. 8, an alternate embodiment is illustrated having a high-impact styrene core 23 (having voids 24) for applications where light weight is an important consideration. Although the cost is substantially higher, a cellular "LEXAN" can also be used as a core.

Obviously, many modifications may be made without departing from the basic spirit of the present invention. Accordingly, within the scope of the appended claims, the invention may be practiced other than specifically disclosed herein.

I claim:

1. A laminated exterior door specifically intended to withstand vandalism, comprising a substrate, a polycarbonate sheet disposed flush against each side of the substrate without any intervening sheet therebetween, the polycarbonate sheets being substantially thinner than the thickness of the substrate, and means including an adhesive bonding each sheet directly to the substrate, the adhesive remaining sufficiently tacky to accommodate the different coefficients of expansion between the substrate and the polycarbonate sheets, thereby allowing the sheets to shift substantially parallel to the substrate without substantial warping or peeling away from the substrate, and thereby maintaining the structural integrity of the laminated door despite temperature variations.

2. The laminated door of claim 1, wherein the substrate comprises a fiberboard core within a wood frame having respective rails and stiles.

3. The laminated door of claim 1, wherein each polycarbonate sheet has an inner surface, and wherein the means for bonding each sheet directly to the substrate further includes abrasions on each side of the substrate and on the inner sides of each polycarbonate sheet.

4. The laminated door of claim 1, wherein the polycarbonate sheets are substantially opaque, and wherein the outer surface of each sheet is embossed.

5. A laminated exterior door specifically intended to withstand vandalism, comprising a substrate including a fiberboard core and further including a wood frame having respective rails and stiles, a pair of polycarbonate sheets, one on each side of the substrate, the polycarbonate sheets being substantially thinner than the thickness of the substrate and being disposed flush against the substrate without an intervening sheet therebetween, each of the polycarbonate sheets being substantially opaque, at least one of the sheets having an outer surface which is embossed, each of the sheets further having an inner surface having abrasions thereon, the substrate further having respective outer surfaces having abrasions thereon, and an adhesive bonding each sheet directly to the substrate, the adhesive remaining sufficiently tacky to accommodate the different coefficients of expansion between the substrate and the polycarbonate sheets, thereby allowing the sheets to shift substantially parallel to the substrate without substantial warping or peeling away from the substrate, and thereby maintaining the structural integrity of the laminated door despite temperature variations.

6. The laminated door of claim 5, wherein the adhesive comprises a two-part moisture curing urethane.

7. The laminated door of claim 5, wherein the respective abrasions have a maximum depth of about 0.005 inch.

8. A laminated exterior door specifically intended to withstand vandalism, comprising a substrate having an outer surface with abrasions thereon, at least one sheet having a relatively-high impact resistance, the sheet being substantially opaque, the sheet being disposed flush against the substrate without an intervening sheet therebetween, the sheet further having an inner surface with abrasions thereon, and means including an adhesive bonding the sheet directly to the substrate, the adhesive remaining sufficiently tacky to accommodate the different coefficients of expansion between the substrate and the sheet, thereby allowing the sheet to shift substantially parallel to the substrate without substantial warping or peeling away from the substrate, and thereby maintaining the structural integrity of the laminated door despite temperature variations.

9. The laminated door of claim 8, wherein the sheet is made of polycarbonate.

10. The laminated door of claim 8, wherein the substrate has respective outer surfaces, and wherein a polycarbonate sheet is bonded directly to each outer surface of the substrate.

* * * * *